United States Patent [19]

Bruckert et al.

[11] Patent Number: 5,309,503
[45] Date of Patent: May 3, 1994

[54] DYNAMIC CHANNEL ASSIGNMENT IN A COMMUNICATION SYSTEM

[75] Inventors: Eugene J. Bruckert, Arlington Heights; Gerald P. Labedz, Chicago, both of Ill.

[73] Assignee: Motorola, Inc., Schaumburg, Ill.

[21] Appl. No.: 802,932

[22] Filed: Dec. 6, 1991

[51] Int. Cl.$^5$ .......................................... H04M 11/00
[52] U.S. Cl. ....................................... 379/60; 455/33.2; 455/33.4
[58] Field of Search ............................. 379/59, 60, 63; 455/33.1, 33.2, 33.3, 33.4, 34.1, 56.1, 62

[56] References Cited

U.S. PATENT DOCUMENTS

| | | | |
|---|---|---|---|
| 3,906,166 | 9/1975 | Cooper et al. | 379/60 |
| 4,144,411 | 3/1979 | Frenkiel | 379/60 |
| 4,718,081 | 1/1988 | Brenig | 379/60 |
| 4,759,051 | 7/1988 | Han | 379/59 |
| 4,771,448 | 9/1988 | Koohgoli et al. | 379/59 |
| 4,975,939 | 12/1990 | Sasaki | 379/60 |

*Primary Examiner*—Curtis Kuntz
*Assistant Examiner*—Dwayne D. Bost
*Attorney, Agent, or Firm*—Richard A. Sonnentag

[57] ABSTRACT

A communication system dynamically assigns channels to a subscriber unit so as to, inter alia, mitigate the effects of co-channel interference in the system. The communication system has a plurality of base-stations receiving the transmission of a subscriber unit desiring service. Upon receipt of the subscriber unit's transmission, each base-station determines a signal quality value, which it then reports to a system controller. The system controller determines the best signal quality value reported and assigns a channel to the base-station which reported the best signal quality value. The chosen base-station transmits to the subscriber unit on an assigned channel to establish communication. The assigned channel transmitted by the chosen base-station need not be associated with the channel the subscriber transmits on. In fact, either channel may be any one of the channels allocated for use by the communication system.

23 Claims, 7 Drawing Sheets

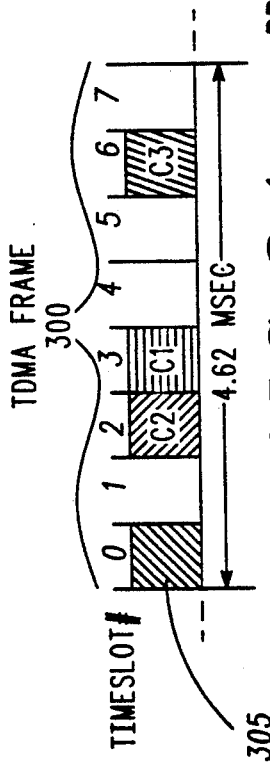
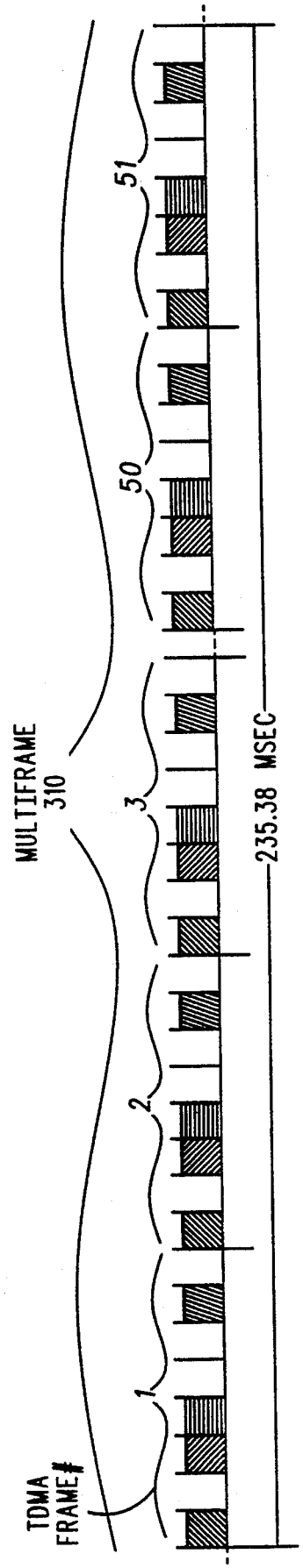
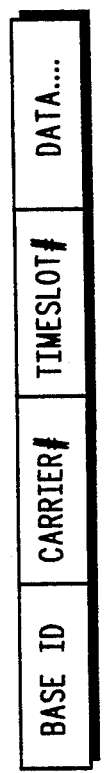
FIG.3A —PRIOR ART—
FIG.3B
FIG.3C

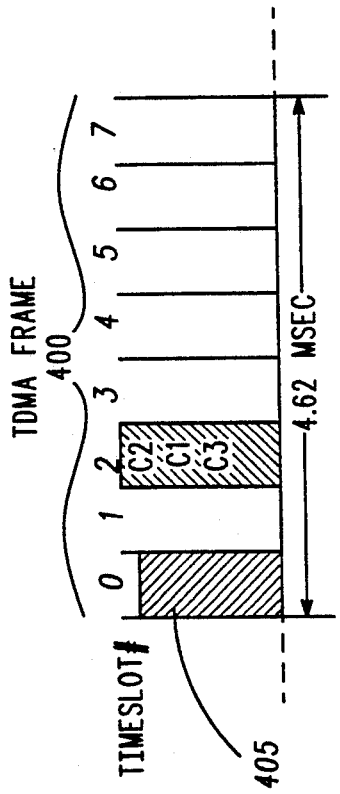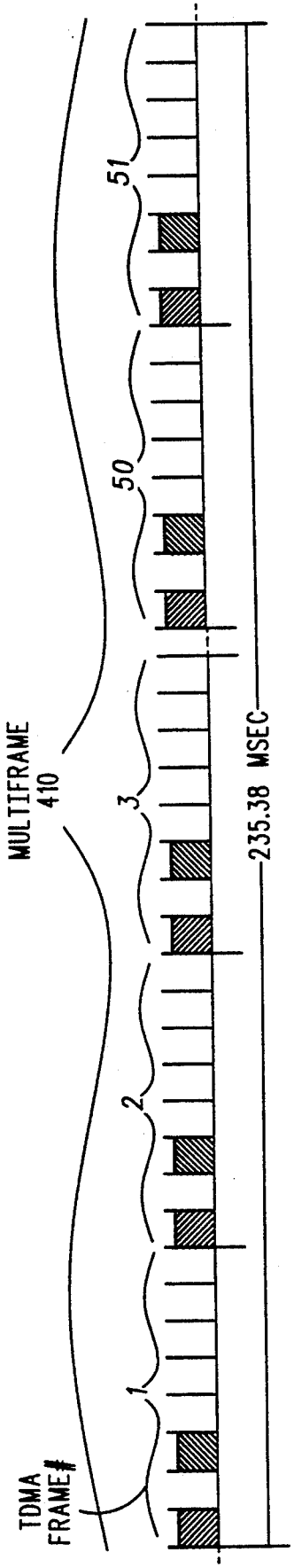
FIG.4A
FIG.4B
FIG.4C

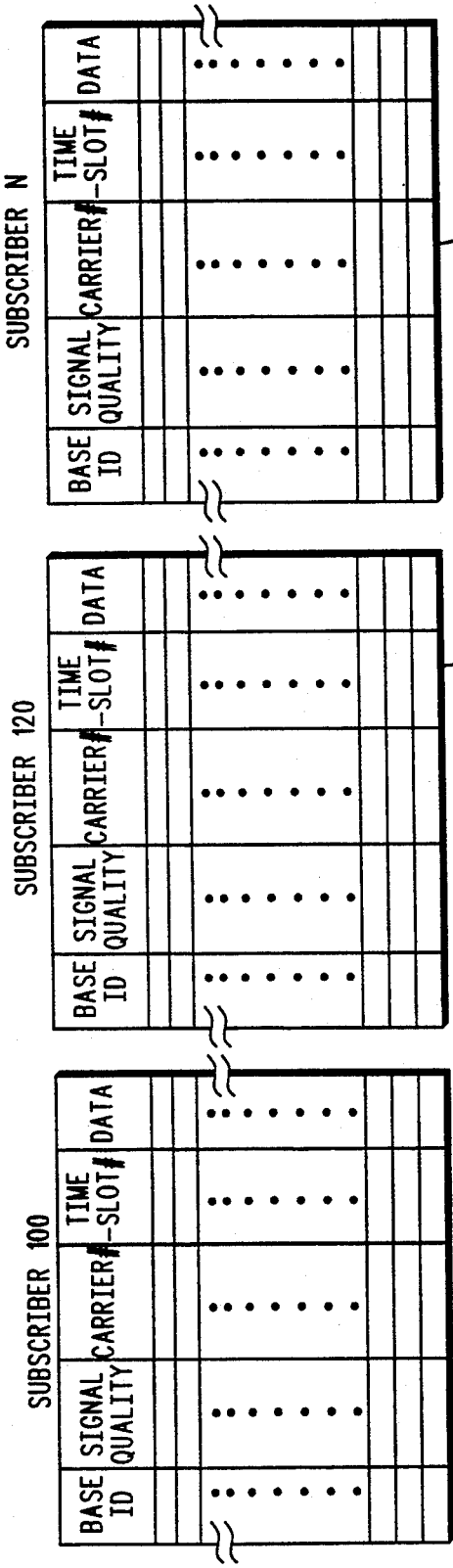
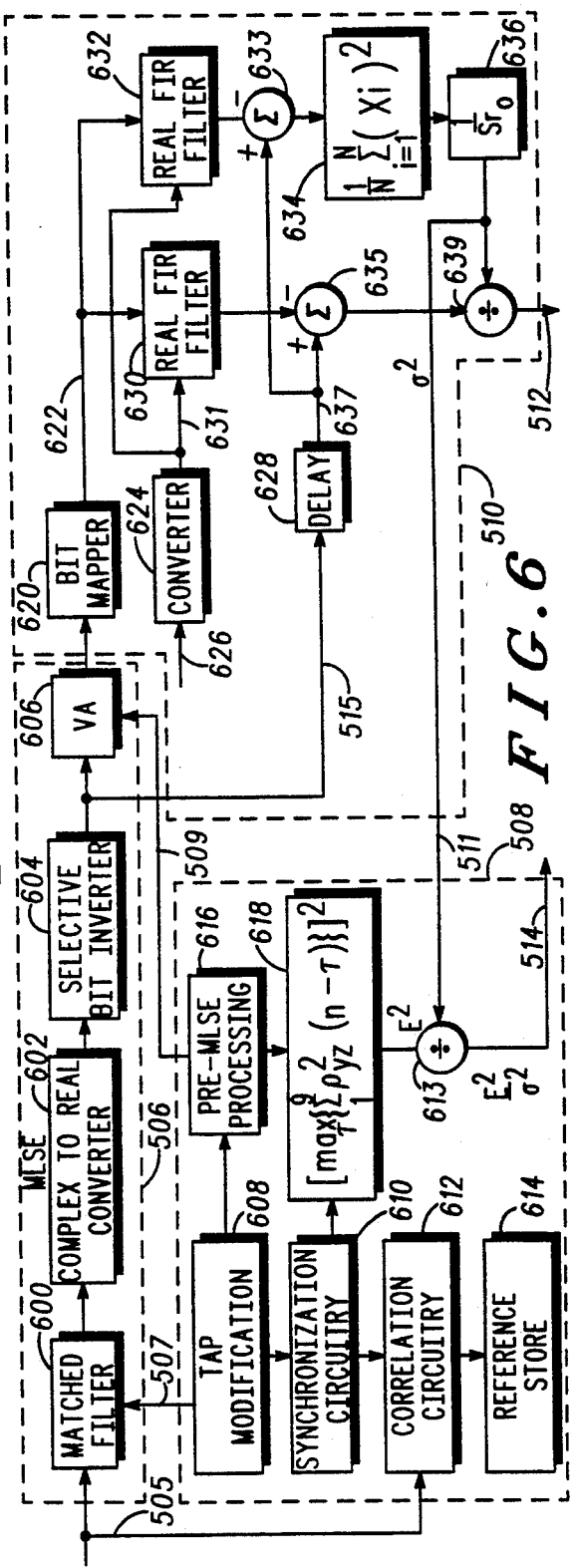
FIG. 7
FIG. 6

DYNAMIC CHANNEL ASSIGNMENT IN A COMMUNICATION SYSTEM

FIELD OF THE INVENTION

The invention relates generally to communication systems and more specifically to communication systems which incorporate handoff to maintain communication with a subscriber.

BACKGROUND OF THE INVENTION

Communication systems, and particularly cellular radiotelephone systems, typically transfer communication of a subscriber unit from one cell to another by attempting to measure the signal strength, and perhaps other measures of communication quality, of a subscriber unit, or mobile. In cellular radiotelephone systems, the process of using quality measurements to choose a better communication path is known as handoff. As digital cellular radiotelephone systems mature, additional signal quality criteria, such as quality of the uplink and downlink path of the subscriber/base-station communication, can be implemented to aid in the handoff process. The process of measuring all the desired signal quality criteria, however, is time intensive, at least on the order of several seconds. When the signalling required to perform handoff, such as signalling between a switch and base-stations involved in the handoff, is included, additional seconds are added to the already time intensive task.

In certain cellular radiotelephone system regions, traffic handling capacity can only be increased by making the cell size smaller and smaller. As the shrink of cell size continues, eventually the traditional cell becomes a mini-cell, or micro-cell. The difference between normal cells and micro-cells is readily distinguishable. For example, a normal cell may be characterized by having its coverage area typically greater than one square mile; antennas elevated significantly above most nearby structures so that the resultant radiation pattern is primarily determined by the antenna itself; and good in-street signal strength within the required coverage area. Micro-cells, on the other hand, may be characterized by having a coverage area less than one square mile-usually much less; antennas below many of the neighboring structures so that the resultant radiation pattern is primarily determined by the nearby reflectors and not the antenna directivity; and good in-building signal strength within its coverage area. The coverage area is more or less determined by the regions of good signal strength. As usage increases and/or the need for in-building communication builds, more of the spectrum will be allocated to the micro-cells.

In micro-cellular systems, the variation in measured signal strength is even greater than that for larger, normal cell systems for a variety of propagation reasons. The greater variation in the mean value of the signal strength would require an even longer measurement time to establish the mean, and several reasons as to why this is unacceptable exist. First, the subscriber unit could be moving through the cells at a rate which would put the subscriber unit out of the cell by the time the measurement was made. Second, the expected rapid variation in the mean signal strength can suddenly cause the signal strength to drop signficantly below an acceptable level. This might occur when a subscriber unit simply turns a corner in an urban environment and its signal fades temporarily. These factors, when combined, actually serve to limit the minimum size a micro-cell can take on; cell size is typically measured by approximate cell radius or by the distance between base sites needed to serve an area. Since the ability of the system to serve a certain number of subscribers is directly proportional to the size of the cell, these factors, in traditional cellular system designs, directly limit the capacity of the system.

The use of micro-cellular systems also brings with it the inherent problem of co-channel interference. As in larger, normal cellular systems, the use of a reuse pattern in micro-cellular systems would help to mitigate or even eliminate co-channel interference. However, reuse patterns limit the overall subscriber capacity when viewed on a per-cell basis.

Thus, a need exists for a radiotelephone system incorporating micro-cellular structure which accommodates for rapid variations of signal quality criterion and mitigates the effects of co-channel interference while maintaining a higher subscriber capacity than traditional communication systems.

SUMMARY OF THE INVENTION

A method of dynamic channel assignment in a communication system. The communication system has at least two fixed base-stations, each capable of communicating to an ambulant subscriber. The method comprises the steps of assessing, at least the two fixed base-stations, the quality of a signal transmitted by the subscriber and assigning a chosen base-station to communicate to the subscriber based on the assessed relative qualities of the signal.

BRIEF DESCRIPTION OF THE DRAWINGS

FIG. 3A-C depicts a typical TDMA frame.

FIG. 4A-C depicts a TDMA frame incorporating dynamic channel allocation in accordance with the invention.

FIG. 6 illustrates in greater detail operation of MLSE 506, modification circuitry 508, and output circuitry 510 of FIG. 5.

FIG. 7 illustrates tables the switch 210 generates and maintains in accordance with the invention.

DETAILED DESCRIPTION OF A PREFERRED EMBODIMENT

The communication system, which in the preferred embodiment is a cellular radiotelephone system, serves to maintain the quality of an individual cellular radiotelephone call at a high level by acknowledging that in smaller, micro-cellular systems or in an urban environment densely populated with subscribers, the signal variations will typically be several dB larger than has traditionally been measured. To allow the micro-cellular system more flexibility, the micro-cellular coverage area is populated with base-stations which share a subset, and ideally all, of the cellular frequencies available to the entire system, in accordance with the invention. In this way, at any particular moment, any base-station is able to receive any frequency and transmit any frequency, thus mitigating the effects of co-channel interference.

Figure 1:
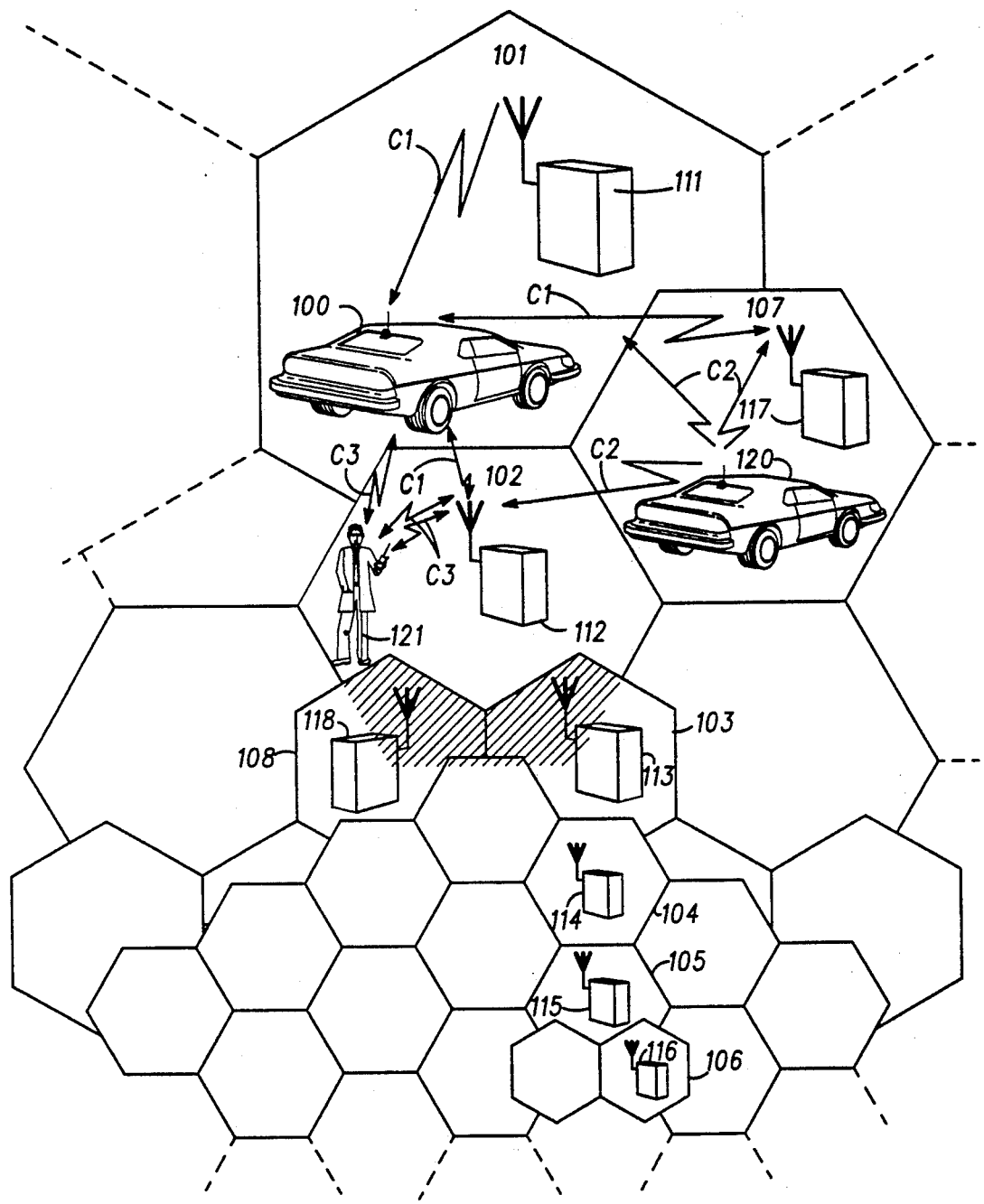
FIG. 1 generally depicts a physical topology of a cellular radiotelephone system.

FIG. 1 generally depicts the topology of a cellular radiotelephone system in accordance with the invention. As depicted in FIG. 1, the cellular radiotelephone system is comprised of cells having varying sizes of coverage area. For purposes of example, let all cells be micro-cells relative to a typical sized cell. As is typical in cellular radiotelephone systems, an ambulant (moving) subscriber 100 communicates with a base-station 111, base-station 111 being approximately centered within cell 101. As subscriber 100 moves around cell 101, the signal strength of a signal C1 transmitted by subscriber 100 will vary as measured by base-station 111. Since the cells depicted in FIG. 1 are micro-cells, the subscriber 100 may be out of cell 101 if handoff is necessary and conventional handoff techniques are employed. Also, if many subscribers, either mobile or hand-held portables, overload the micro-cellular coverage area depicted in FIG. 1, the micro-cellular system must provide a communication path for as many of those subscribers as possible.

Current, large-cell radiotelephone systems incorporate full-duplex channels to maintain communication between subscriber 100 and base-station 111. A full-duplex channel contains a fixed pair of directional links, an uplink and downlink, where one link is for transmission and the other link is for reception. In the preferred embodiment, the downlink path is communication from a base-station to a subscriber while an uplink path is communication from a subscriber to a base-station. The allocated frequency range for the particular system defines the frequencies at which communication on the links occur. When communicating on a full-duplex channel, subscriber 100 and base-station 111 typically remain on the same channel (frequency) during the duration of the communication.

Figure 2:
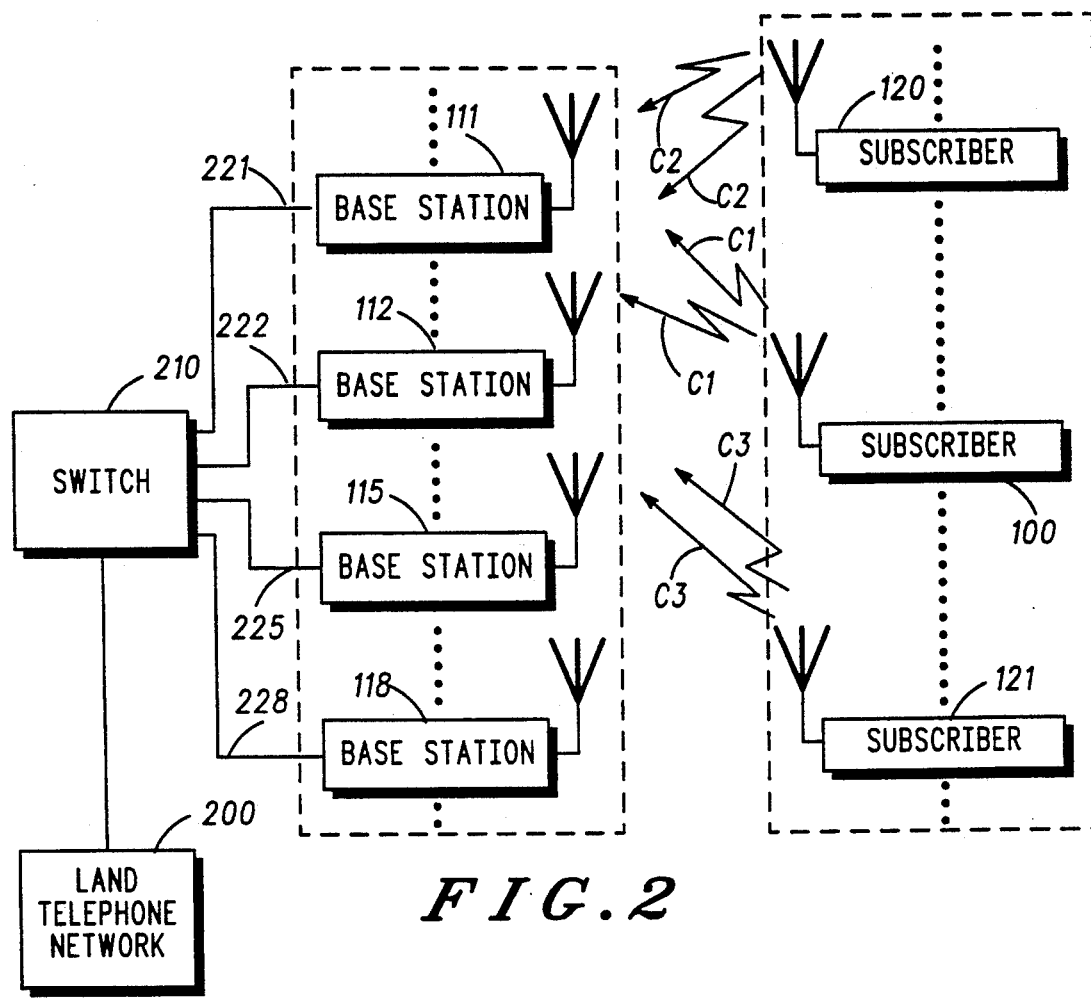
FIG. 2 generally depicts a logical representation of the cellular radiotelephone system of FIG. 1.

FIG. 2 generally depicts a logical representation of a cellular radiotelephone system. Referring to FIG. 2, base-stations 111-118 are grouped together for clarity. Likewise, subscribers 100, 120 and 121 are shown as being grouped with a plurality of other possible subscribers. A switch 210 is coupled to base-stations 111-118 via links 221-228. In the preferred embodiment, the links are 2.048 Mbit/second digital spans termed "DS-2" in Germany, "Megastream" in the United Kingdom, and "T1 Spans" in the United States. Likewise, the switch may be an EMX switch, available from Motorola, Inc. and described in Motorola Instruction Manual No. 68P81054E59 published by Motorola Service Publications, Schaumburg, IL. Continuing, switch 210 is coupled to a land telephone network 200, which in the preferred embodiment is a public switched telephone network (PSTN).

FIG. 2 depicts subscribers 100, 120, 121 attempting to communicate to base-stations 111-118. When a subscriber 100 transmits a message (uplink path), any base-station 111-118 in the vicinity of subscriber 100 is able to, and does, receive the transmitted message. At approximately the same time, base-stations 111-118 may also receive an uplink message from a different subscriber 120, 121 using the very same uplink frequency. If the system were a time-division multiple access (TDMA) system, such as the GSM Digital Cellular System described in GSM Recommendation 1.02, version 3.0.0, March 1990, the uplink message would contain packets of information transmitted within individual timeslots. FIG. 3A generally depicts a typical TDMA frame 300 having timeslots containing transmissions between a receiving base-station 111 and several subscribers 100, 120, 121. Timeslot 0(305) of every TDMA frame 300 is utilized for control information in the preferred embodiment. Timeslots 1-7 are typically utilized for voice data transmission, and are in fact the timeslots in which subscribers 100, 120, 121 transmit voice data within. It should be obvious that in this embodiment, TDMA frame 300 can accommodate at most seven different subscribers at any given time.

Referring to FIG'S. 2 and 3, transmissions C1-C3 occur at the same frequency, but are digitally coded to allow for separation into timeslots within a given TDMA frame 300. Important to note is that FIG. 2 only depicts uplink transmission, but one of ordinary skill in the art would recognize that downlink transmission from base-station 111 to subscribers 100, 120, 121 occurs on the other half of the full-duplex link. Continuing, in conventional TDMA cellular radiotelephone systems, transmissions C1-C3 by subscribers 100, 120, 121 are separated into timeslots on a particular frequency and the transmissions remain in that timeslot for the remainder of the call. FIG. 3B depicts transmissions C1-C3 remaining in their assigned timeslot as a call continues. A multiframe 310, which is a series of 51 TDMA frames 300, continuously repeats and contains transmissions C1-C3 in the same timeslots (i.e., C2 always in timeslot 2, C1 always in timeslot 3, C3 always in timeslot 6) for as long as the call is maintained between the calling parties. Given the somewhat restrictive nature of this TDMA implementation, base-station 111 transfers to switch 210 such information as base-station ID (base-station 111), carrier # (frequency), timeslot #, and the corresponding voice data. A typical message transferred from base-station 111 to switch 210 in this TDMA implementation is depicted in FIG. 3C. The message is employed by switch 210 to configure base-station 111, if chosen, for proper downlink transmission. In this manner (using the message), switch 210 delivers downlink voice data to the proper base-station 111 for transmission on the proper carrier during the proper timeslot.

In conventional radiotelephone systems, when a subscriber 100, 120 and 121 requires handoff from base-station 111 to another base-station, base-station 111 must request switch 210 to poll neighboring base-stations for both signal quality of the particular subscriber's transmission and carrier availability. If switch 210 finds a candidate neighbor base-station, switch 210 notifies base-station 111 to instruct the particular subscriber to a new carrier and timeslot. This handoff process may take up to several seconds to complete; given the reduced size of the micro-cellular configuration and this lengthy handoff process, the particular subscriber will experience poor signal quality and, in the worst scenario, a dropped call.

FIG. 4 depicts a TDMA frame which accommodates dynamic channel allocation in accordance with the invention. FIG. 4A depicts a TDMA frame 400 received by base-station 111. In FIG. 4A, transmissions C1-C3 are allowed to be on the same carrier (frequency) during the same timeslot. FIG. 4A is a snapshot, in time, of a TDMA frame 400 received by base-station 111; during a subsequent TDMA frame 400, timeslot 2 could, and probably will, contain one or more different transmissions from totally different subscribers, as depicted in FIG. 4B. To accommodate the enhanced decision making by switch 210, the message depicted in FIG. 3C needs to have a subscriber ID message and a signal quality value message added to it. The resulting message which is sent to switch 210 in accordance with the invention is depicted in FIG. 4C.

Figure 5:
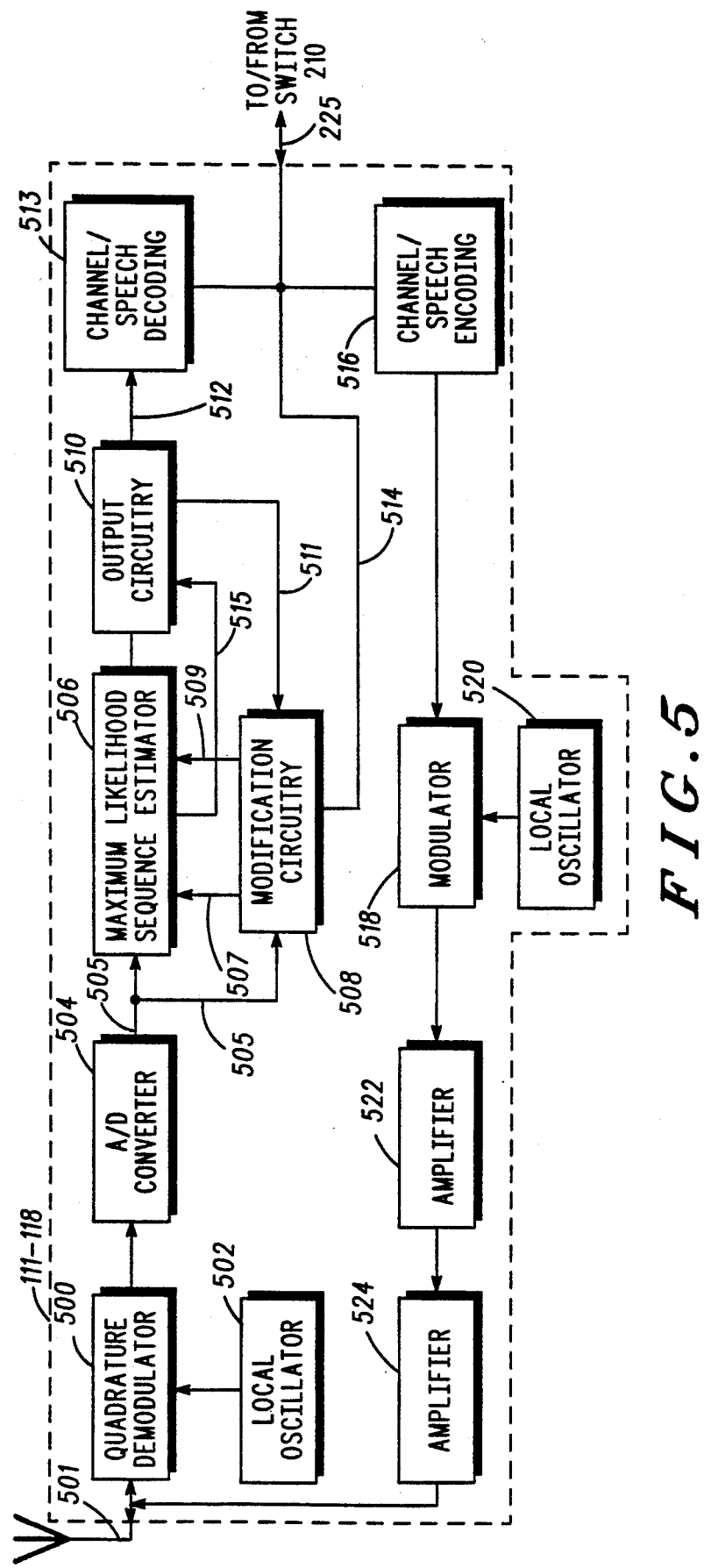
FIG. 5 generally depicts, in block diagram form, base stations 111-118 which may beneficially implement dynamic channel assignment in accordance with the invention.

FIG. 5 generally depicts, in block diagram form, base stations 111-118 which may beneficially implement dynamic channel assignment in accordance with the invention. Signals C1-C3 transmitted on a common carrier during a common time slot (such as that depicted in FIG. 4A) are received by antenna 501. The signal, which contains data from C1-C3, enters quadrature demodulator 500 which demodulates the burst signal into I (In phase) and Q (Quadrature phase) components. At this point, the quadrature demodulator is unaware that the burst contains three separate transmissions C1-C3; it simply demodulates whatever data is within a particular time slot. The demodulated data is sent to A/D converter 504 which converts the demodulated I and Q components into a corresponding digital signal 505. The digital signal 505 exiting A/D converter 504 is input into both a maximum likelihood sequence estimator 506 (MLSE) and modification circuitry 508. MLSE 506 and modification circuitry are used to essentially reconstruct the digital signal 505. After reconstruction, the reconstructed signal is output from MLSE 506 into output circuitry 510. A signal 512 exiting output circuitry 510 enters a channel/speech decoding 513 block where the signal 512 is decoded into the proper voice data. Also output from output circuitry 510 is a signal 511 which is fed into modification circuitry 508. Finally, exiting modification circuitry 508 is a signal 514 which represents the signal quality value eventually transferred to switch 210 for decision making purposes.

FIG. 6 illustrates in greater detail operation of MLSE 506, modification circuitry 508, and output circuitry 510. Digital signal 505 entering modification circuitry 508 represents digitized values of the demodulated I and Q signals ($I_D$ and $Q_D$). Signals $I_D$ and $Q_D$ are input into correlation circuitry 612, as is the appropriate predetermined mid-amble (a known bit sequence in the middle of a timeslot) which is stored in reference store 614. Correlation circuitry 612 then correlates the mid-amble of signals $I_D$ and $Q_D$ to the predetermined mid-amble. The output from correlation circuitry 612 is a correlation signal C(t) which essentially depicts, in time, the correlation performed by correlation by circuitry 612. The magnitude of correlation signal C(t) is defined by the equation:

$$|C(t)| = \sqrt{I_{DN}^2 + Q_{DN}^2}$$

where $I_{DN}$ and $Q_{DN}$ are the nth sample of $I_D$ and $Q_D$ respectively. Synchronization circuitry 610 provides synchronization to correlations signal C(t) which is then fed to tap modification block 608. Output from tap modification block 608 is a modified channel impulse response 507, which contains the required taps to construct match filter 600. Also, output from tap modification block 608 is a signal which enters pre-MLSE processing block 616. Signal 509 exiting pre-MLSE processing block 616 enters the MLSE 506 and is input into the Viterbi algorithm 606 (VA) block.

Operation of MLSE 506 is as follows. A digital signal 505 which again is represented by $I_D$ and $Q_D$, is input into matched filter 600. Matched filter 600 is an adaptive filter and is supplied with coefficients which are functions of the modified channel impulse response 507. Matched filter 600 generates a signal which is supplied to complex to real converter 602, which in turn generates a real signal which is supplied to selective bit inverter 604. Bit inverter 604 generates a non-inverted output signal 515 which is supplied to Viterbi algorithm block 606. Again, Viterbi algorithm block 606 is supplied with coefficients which are functions of the modified channel impulse response on line 509.

The Viterbi algorithm 606 forms a trellis operative to estimate sequences of data responsive to application of the signal on line 515. The estimated sequences are generated and supplied to bit mapper 620. Bit mapper 620 is operative to convert the binary-value data stream supplied into arithmetic values (i.e., positive and negative one values). The arithmetic data stream formed by bit mapper 620 is generated on line 622 and is supplied to filter 630 which is comprised of a 9-tap real FIR filter. Filter 630 is supplied with real coefficients which are functions of the modified channel impulse response. The coefficients are supplied on line 626, are converted by converter 624 to be in real form and are supplied to filter 630 on line 631. Again, the coefficients of the center tap of filter 630 is of a value of zero. (The characteristics of filter 630 are modified to compensate for the effects of matched filter 600.)

The arithmetic data stream generated on line 622 is additionally supplied to filter 632 which is also a 9-tap real FIR filter having coefficients which are a function of the modified channel impulse response. Filter 632 synthesizes a channel in which all multi-path signal components are present. And application of the data stream permits synthesis of transmission of the signal on a transmission channel. The inverse of the signal formed by filter 632 is supplied to summer 633.

Summers 635 and 633 additionally are supplied with the non-inverted signal generated by bit inverter 604 which is suitably delayed in time by delay element 628. Line 515 interconnects bit inverter 604 and delay element 628, and delay element 628 generates a delayed, non-negative signal on line 637 which is supplied to summers 635 and 633. The output of summer 633 is an error signal, $x_i$, and is supplied to block 634 which computes a sample variance of the input signal. The sample variance is calculated according to the equation $$\frac{1}{N} \sum_{i=1}^{N} (X_i)^2, \text{ also}$$

also illustrated within block 634. The calculated sample variance is supplied to block 626, where the sample variance is further scaled by the factor $1/S_{r0}$. $S_{r0}$ is the zero lag, auto correlation of the matched filter coefficients; additionally, $S_{r0}$ is the interproduct of the complex vector of matched filter coefficients with itself. The scaled, sampled variance calculated at block 636 is supplied to modification circuitry 508 via line 511. The scaled sample variance on line 511 represents the noise plus distortion in the received signal.

Referring to modification circuitry 508, output from pre-MLSE processing block 616 is input into block 618 which calculates the square of the energy of the demodulated and correlated burst. Output from block 618 is input into a divider 613 which divides the noise plus distortion of the received signal by the square of the energy produced by block 618. Output from the divider is thus the signal quality value transferred to switch 210 and used for decision making.

The signal quality value measured by base-stations 111–118, depicted in FIG. 4C, and shown by output signal 514 in FIG. 5 is given by $$\sigma^2/E^2$$

where, in the preferred embodiment, $\sigma^2$ is a measure of the noise plus distortion in the received signal, and $E^2$ is a measure of the energy in the signal squared. The quantity $\sigma^2/E^2$ is correlated strongly to the number of errors in the burst, and is more effective than either $\sigma^2$ or $1/E^2$ taken alone.

The noise plus distortion value $\sigma^2$ is corrupted from the ISI-canceller filter outputs. Where each bit detected by the MLSE 506 of the base-stations 111–118 has associated with it an ISI-canceller value, $x_i$ $$\sigma^2 = \left( \sum_1^i x_i \right)^2$$

The $E^2$ term can be derived from the correlation/synchronization part of the receiver where samples are taken of the correlation with the stored reference. These samples are taken at T or T/2 spaced intervals, where T is a received symbol time. For example, if there were nine such sampling points, the various sets of nine points would be tried until their sum is a maximum. The samples represent samples $\rho_{yz}^{(n-\tau)}$ where y(m) is the received signal, z(m) is the stored reference and n and m are indices to the sampled functions. The value $\tau$ is the relative shift between them when a particular cancelation value is computed. E, or the burst energy value is taken as $$E = \max_\tau \left\{ \sum_1^9 \rho_{yz}^2(n - \tau) \right\}$$

Of course, the number of sampled points on $\rho_{yz}^{(n-\tau)}$ need not be restricted to 9. The burst energy is then squared for use in the signal quality value measure.

Figure 8:
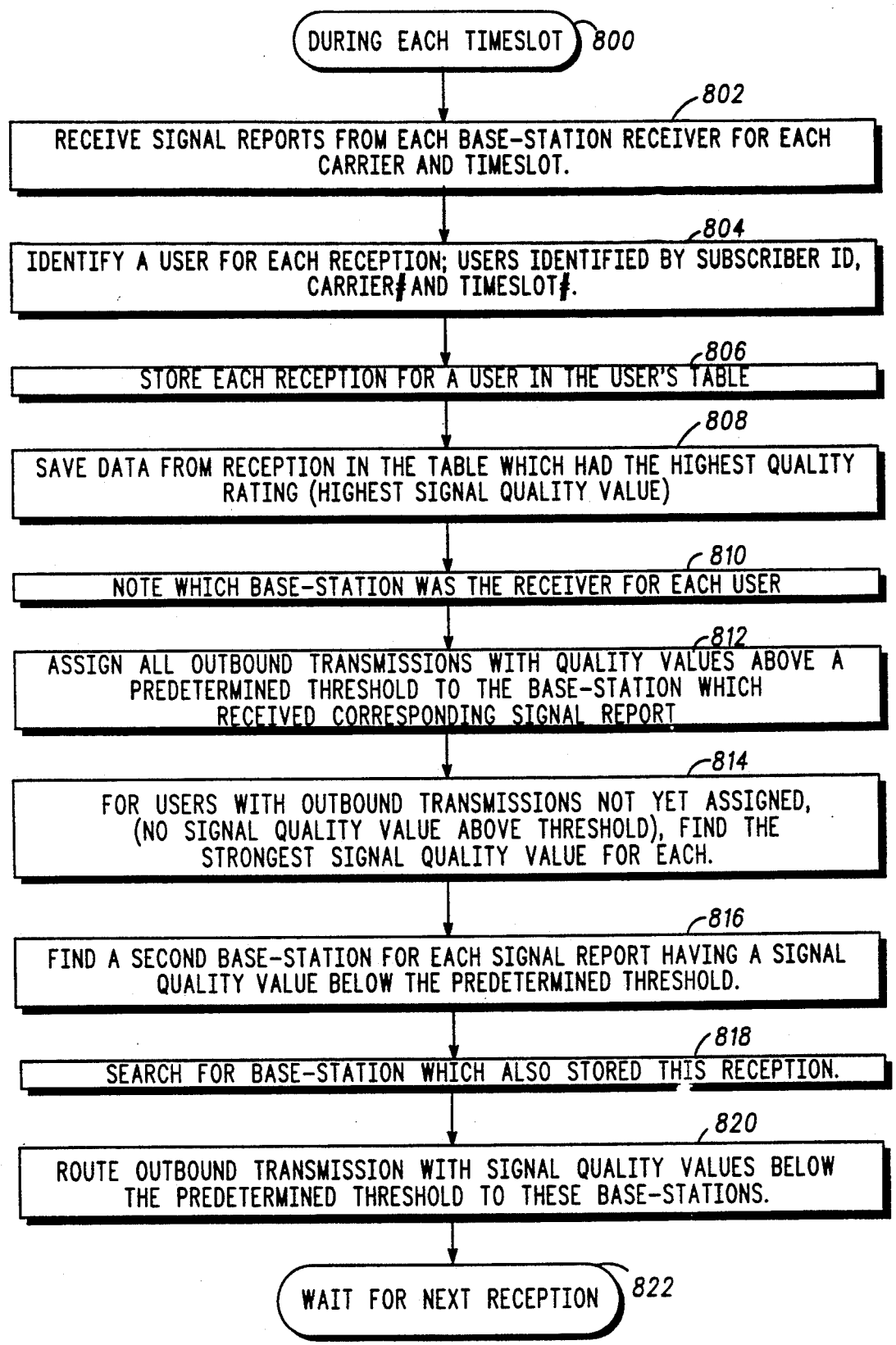
FIG. 8 generally depicts the steps the switch 210 undergoes to perform dynamic channel allocation in accordance with the invention.

After each base-station receiving the transmissions determines the signal quality value, the message of FIG. 4C can be transferred to the switch 210. When at the switch 210, the information from the message in FIG. 4C is stored into a table as depicted in FIG. 7. The steps the switch 210 undergoes to perform dynamic channel allocation in accordance with the invention are depicted in FIG. 8. At step 802, the switch 210 receives signal reports from each base-station receiver for each carrier and timeslot. The switch 210 identifies at 804 a user (subscriber) for each reception; subscribers are identified by subscriber ID, carrier number and timeslot number. The switch then stores at 806 each reception for a subscriber in the subscriber's table and saves at 808 the data from each reception in the table which had the highest quality rating (highest signal quality value). The switch 210 notes at 810 which base-station was the receiver for each user and assigns at 812 all outbound (downlink) transmissions with quality values above a predetermined threshold to the base-station which received the corresponding signal report. At step 814, the switch 210 finds the strongest signal quality value for each subscriber with outbound transmissions not yet assigned (signal quality value not above the predetermined threshold). The switch 210 then finds at 816 a second base-station for each signal report having a signal quality value below the predetermined threshold and searches at 818 for base-stations which also stored this reception. The switch then routes at 820 those outbound transmissions with signal quality values below the predetermined threshold to these base-stations and waits at 822 for the next reception.

When the same uplink carrier and timeslot are used by two (or more) different subscribers 100, 120, 121, the packets of information received by base-station 111 will have poor reception quality due to co-channel interference. In fact, several of the bits in the packet, possibly even most of the bits, may be in error. However, there will be some base-stations within the system which, do to geographic and propagation effects, will receive that transmitted packet with an acceptable level of quality or a level of quality of which, when combined with techniques such as coding and interleaving, ultimately produce acceptable results. Regardless of the quality, however, the bits that are detected from the packet along with a signal quality value determined by base-stations 111–118 receiving the uplink message, are sent to switch 210. Switch 210 scans all the individual carriers (frequencies) allocated to the system and analyzes the quality reports from all base-stations 111–118 which have received the uplink message on a particular carrier and timeslot, and accepts an individual packet on a carrier only from the base-station that gives the best quality report for that particular packet.

In conventional cellular systems, one base-station is typically a dedicated packet receiving point for one particular subscriber unit, for example, base-station 111 for subscriber unit 100. The dedicated base-station monitors the quality of transmission by the subscriber unit 100 and notifies target base-stations when a handoff is required. The target base-stations measure the transmission quality of the subscriber unit 100, notify the switch 210, and the switch tells a chosen target base-station to tune to a new frequency for communication. The micro-cellular system, in accordance with the invention, is different from conventional cellular systems in that any base-station can be the receiving point for a particular subscriber within a first subset of frequencies, and allocation of this "receiving" base-stations could actually be made to change in the extreme case of every single time a new packet is transmitted by a subscriber unit 100. As a subscriber unit 100 moves throughout a micro-cell coverage area, all base-stations within the coverage area measure the transmission of the subscriber unit 100 and report the measurement back to the switch 210. The switch 210 assesses the relative quality measurements and assigns the base-station reporting the best relative quality to receive the uplink transmission of the subscriber unit 100. In addition, the switch 210 may decide to maintain downlink transmission on the original base-station so that the chosen base-station need not transmit a downlink signal to the subscriber unit 100. By dynamically separating the uplink path from the downlink path, the micro-cellular radiotelephone system compensates for co-channel interference by constantly receiving the best uplink transmission made by the subscriber 100. In addition, the system allows for reduced control messaging, which in turn increases the speed at which allocation can be performed.

Important to note is that changing of base-stations receiving the transmitted packet is transparent to the subscriber unit 100; no control signalling need be sent to the subscriber unit 100 to accomplish this dynamic base-station receiver assignment. Consequently, as a subscriber unit 100 moves throughout the micro-cellular coverage area, each of its transmissions may actually be received by different base-stations without any signalling, and hence without its knowledge. Consequently, there is no handoff as required in conventional systems.

If the system is allowed to dynamically assign communication to any channel in the system, channels will, in a sense, wander from cell-to-cell or non-traditional channel pairs (against traditional reuse patterns) will be formed. This "flexibility" in the system could potentially lead to bunching of channels in unintended areas. To reduce this bunching, the system should be capable of dynamically re-configuring itself into an appropriate reuse pattern. Factors the system must take into account to re-configure itself might include: control vs traffic channel bunching, physical cell vs logical cell configurations, movable channel sets vs stationary channel sets, lists of unusable channels in each cell dynamically updated, list of potential handover channels in each cell dynamically updated, etc. In this fashion, the system is never restricted to a particular reuse pattern as in traditional systems, thus channel use, and consequently subscriber capacity, are continuously optimized.

When down-link transmission is required, switch 210 decides which base-station 111–118 will transmit to a particular subscriber 100, 120, 121. The signal quality value measured on the uplink message by any base-station receiving the packet is stored, and switch 210 decides which base-station 111–118 should transmit the downlink packet to subscriber 100. If any of the base-stations which received the packet report a signal quality value above a predetermined threshold, that particular base-station is the prime base-station for transmission on the downlink path to subscriber 100. For example, if subscriber's 100 and 120 transmission was received by base-stations 111, 112, 117 on a common carrier during a common timeslot, those base-stations 111, 112, 117 would measure a packet quality value of the transmission and report it to switch 210. If one of the quality values reported by a base-station, say base-station 111, were above a particular, predetermined threshold for subscriber 100, then base-station 111 would be the prime base-station for transmission back to subscriber 100. If base-station 111 were not available, then the next base-station with the next highest quality value, say base-station 112, is chosen. This iterative process would continue until a base-station is available for downlink transmission. If, on the other hand, none of the quality values reported by base-stations 111, 112, 117, were above the predetermined threshold, then the downlink transmission would preferably take place from two base-stations. In the preferred embodiment, the two base-stations would be the two base-stations which have the highest measured packet quality values for a particular subscriber 100. This, in effect, produces a downlink transmit diversity effect. The two chosen base-stations may, in fact, be separated by quite a distance, and this may tend to generate statistically independent downlink transmission paths and produce ineffective diversity at the particular subscriber 100. To accommodate the case where a large number of subscribers are served by the diversity effect, the system is likely to require more, perhaps significantly more, outbound channels than the number of subscribers to be served.

In the preferred embodiment, a given coverage area is covered by a large number of base-stations, each of which ideally is capable of receiving and transmitting on any one of the frequencies allocated to the system. FIG. 1 only depicts a small percentage of base-stations 111–118 which are incorporated in the system; in fact, each cell within the system has its own base-station. The entire collection of those base-stations within the system is connected to switch 210 of FIG. 2, which may accept information (signal quality values, subscriber ID, etc.) from each of the various base-stations and make a decision. Furthermore, switch 210 can route all downlink traffic to be transmitted from any base-station to any particular subscriber unit. Thus, all traffic for a coverage area passes through switch 210. It may be possible to have several switches 210 in communication with one another instead of a single one, if the coverage area is large.

In an alternate embodiment, the micro-cells may be a subset of a larger, umbrella cell. For example, referring to FIG. 1, cells 103, 108 could have micro-cell characteristics herein described while cell 102 could have traditional cellular characteristics. To avoid co-channel interference, the micro-cells are allotted a first subset of channels within the set of allocated channels while the umbrella cell is allotted a second subset of channels within the same set of allocated channels. From FIG. 1, micro-cells 103 and 108 have a common coverage area (the shaded section of FIG. 1) with the predetermined coverage area of umbrella cell 102. If a subscriber unit 100 were now moving within that common coverage area, base-stations 112, 113, and 118 would measure the uplink transmission of the subscriber unit 100. A switch 210 (shown in FIG. 2) would assess the measured relative quality of the uplink transmission and assign communication accordingly. If the subscriber unit 100 were initially communicating to base-station 118, a first micro-cell base-station, the switch would assign base-station 113, a second micro-cell base-station, to receive the uplink transmission if it reported the best relative quality measurement. Within the micro-cell system, base-station 118 could maintain downlink communication to the subscriber unit 100 while base-station 113 would maintain uplink communication to the subscriber unit 100. This would not result in a channel change when viewed from the prospective of the subscriber unit 100. However, if base-station 112 reported the best relative quality measurement, traditional handoff techniques would be required since the micro-cells and umbrella cell have different channel partitioning for co-channel mitigation purposes. In this case, both uplink and downlink communication are handed off to base-station 112 in umbrella cell 102, the hand-off occurring from a first channel within the first subset of channels to a second channel within the second subset of channels.

The system idea is compatible with FDMA/TDMA or CDMA-type systems. In the case of FDMA and TDMA, the digital information to be transmitted will be framed and the individual subscribers will be identified by some unique bit pattern within each frame. This might be a particular synchronization sequence assigned to an individual subscriber 100, 120 or it might be the synchronization sequence in combination with another custom sequence within the framed information. In the case of CDMA, the individual subscribers 100, 120 may be identified by their spreading codes. In any case, it is these identifiers which allow system controller 215 to decide which quality reports from which base-stations 111-117 to compare the quality information of in order to make a determination of how to pass the information throughout the system. Therefore, it is necessary for base-stations 111-117 to be able to recognize, in the case of FDMA or TDMA, all the possible identifiers (synchronization codes) possible plus some additional identifying bits. In the case of CDMA, it is necessary for base-stations 111-117 to recognize all of the individual spreading codes. Subscribers 100, 120, however, may be made simpler since they do not sort out multiple transmissions with different identifiers; everything intended for a given subscriber 100, 120 will be transmitted with its own identifier or its own spreading code. Therefore, subscriber 100, 120 need only look at an expected frequency or set of frequencies at an expected time for an expected identifier.

What I claim is:

1. A method of dynamic channel assignment in a communication system, the communication system having a plurality of fixed base-stations, each capable of communicating to an ambulant subscriber, the method comprising the steps of:
    assessing, at the plurality of fixed base-stations, the quality of an uplink signal transmitted by the subscriber;
    accepting, from one of said plurality of fixed base-stations, the uplink signal based on said assessed signal quality; and
    assigning any of the remaining fixed base-stations to transmit a corresponding downlink signal to the subscriber based on the assessed qualities of the signal.

2. The method of claim 1 wherein said step of assessing further comprises the step of assessing the signal strength of a signal transmitted by said subscriber.

3. The method of claim 1 wherein said step of assigning further comprises the step of assigning the said one of said plurality of fixed base-stations to transmit a corresponding downlink signal to the subscriber.

4. The method of claim 1 wherein said step of assigning is performed transparently to the subscriber.

5. A method of dynamic communication assignment in a radiotelephone system, the radiotelephone system having a plurality of base-stations each capable of communicating to a subscriber unit, the method comprising the steps of:
    communicating, on a first base-station, to a subscriber unit on an uplink and downlink path of a channel;
    assessing, at at least the first base-station and a second base-station, the relative quality of said uplink path of said channel; and
    assigning said second base-station to only receive said uplink path of said channel when said relative quality assessed by the second base-station exceeds the relative quality assessed by the first base-station.

6. The method of claim 5 wherein said second base-station need not communicate to the subscriber unit on said downlink path of said channel.

7. The method of claim 5 wherein said step of assigning said second base-station to receive further comprises the step of assigning reception of said uplink path back to said first base-station when said relative quality assessed by said first base-station exceeds the relative quality assessed by said second base-station.

8. The method of claim 5 wherein said step of assigning said second base-station to receive said uplink path is performed transparently to the subscriber unit.

9. A method of dynamic channel assignment in a radiotelephone system, the radiotelephone system having a plurality of cells each having predetermined coverage areas, at least one of the cells acting as an umbrella cell having a plurality of micro-cells, at least two of the micro-cells having common coverage area with the corresponding predetermined coverage area of the umbrella cell, each cell and micro-cell having a base-station within its coverage area to provide radiotelephone coverage for its corresponding coverage area, the method comprising the steps of:
    communicating, on a first base-station corresponding to a first micro-cell, to a subscriber unit on an uplink and downlink path of a first channel;
    assessing, at said first base-station corresponding to said first micro-cell, at at least a second base-station corresponding to at least a second micro-cell and at a third base-station corresponding to the umbrella cell, the relative quality of said uplink path of said first channel;
    assigning said second base-station to only receive said uplink path of said first channel when said relative quality assessed by the second base-station exceeds the relative quality assessed by the first base-station and the third base-station; and
    assigning, via the first base-station, said subscriber unit to handoff communication from said first base-station on a first channel to said third base-station on a second channel when said relative quality assessed by the third base-station exceeds the relative quality assessed by the first base-station and the second base-station.

10. The method of claim 9 wherein said second base-station need not communicate to the subscriber unit on said downlink path of said first channel.

11. The method of claim 9 wherein said step of assigning said second base-station to receive further comprises the step of assigning reception of said uplink path back to said first base-station when said relative quality assessed by said first base-station exceeds the relative quality assessed by said second base-station.

12. The method of claim 9 wherein said step of assigning said second base-station to receive said uplink path is performed transparently to the subscriber unit.

13. The method of claim 9 wherein said first channel is one of a first subset of channels within a set of allocated channels.

14. The method of claim 13 wherein said second channel is one of a second subset of channels within said set of allocated channels.

15. The method of claim 14 wherein there are no common channels within the first subset of channels and the second subset of channels.

16. A radiotelephone system having dynamic communication assignment, the radiotelephone system having at least two base-stations capable of communication to a subscriber unit, the at least two base-stations interconnected via a switch, the radiotelephone system comprising:
    means, at at least the two base-stations, for measuring the quality of an uplink signal transmitted by the subscriber unit;
    means, at the switch, for evaluating said quality of said uplink signal measured by each of said at least two base-stations;

means, at the switch, for assigning one of said at least two base-stations to only receive said uplink signal based on said evaluated quality means, at the switch, for assigning the second of said at least two base-stations to communicate with the subscriber unit on a corresponding downlink path.

17. The radiotelephone system of claim 16, wherein said means for measuring the quality of an uplink signal transmitted by the subscriber unit further comprises means for measuring the signal strength of said uplink signal.

18. The radiotelephone system of claim 16, wherein said means for measuring the quality of an uplink signal transmitted by the subscriber unit further comprises means for measuring the bit error rate (BER) of said uplink signal.

19. A radiotelephone system having dynamic channel assignment, the radiotelephone system having a plurality of cells each having predetermined coverage areas, at least one of the cells acting as an umbrella cell having a plurality of micro-cells, at least two micro-cells having common coverage area with the corresponding predetermined coverage area of the umbrella cell, each cell and micro-cell having a base-station within its coverage area to provide radiotelephone system coverage for its corresponding coverage area, each base-station coupled to one another via a switch, the radiotelephone system comprising:

means for communicating, on a first base-station corresponding to a first micro-cell, to a subscriber unit on both an uplink and downlink path of a first channel;

means for measuring, at said first base-station corresponding to said first micro-cell, at at least a second base-station corresponding to at least a second micro-cell and at a third base-station corresponding to the umbrella cell, the quality of said uplink path of said first channel;

means for assigning said second base-station to only receive said uplink path of said first channel when said quality measured by the second base-station exceeds the quality measured by the first base-station and the third base-station; and means for initiating, at the switch, a transfer of communication from the first base-station to the third base-station on a second channel when said relative quality assessed by the third base-station exceeds the relative quality assessed by the first base-station and the second base-station.

20. The radiotelephone system of claim 19 wherein said means for measuring the quality of said uplink path of said first channel further comprises means for measuring the signal strength of said uplink path of said first channel.

21. The radiotelephone system of claim 19 wherein said means for determining if either of said second or third base-stations should communicate to the subscriber unit further comprises means for determining at least one cell-type determination factor.

22. The radiotelephone system of claim 19 wherein said means for determining if either of said second or third base-stations should communicate to the subscriber unit further comprises means for comparing the quality measured by said first, second, and third base-station.

23. The radiotelephone system of claim 22 wherein said means for initiating a transfer of communication further comprises means for assigning, via the first base-station, said subscriber unit to handoff communication from said first base-station on a first channel to said third base-station on a second channel when said quality measured by the third base-station exceeds the quality measured by the first base-station and the second base-station.

* * * * *

UNITED STATES PATENT AND TRADEMARK OFFICE
CERTIFICATE OF CORRECTION

PATENT NO. : 5,309,503

DATED : May 3, 1994

INVENTOR(S) : Bruckert et al.

It is certified that error appears in the above-identified patent and that said Letters Patent is hereby corrected as shown below:

Col. 12, line 59, please delete "communication" and insert therefor —communicating—.

Col. 13, line 3, after "quality" insert —; and—, and begin a new paragraph.

Signed and Sealed this

Thirteenth Day of September, 1994

Attest:

BRUCE LEHMAN

Attesting Officer

*Commissioner of Patents and Trademarks*